United States Patent [19]

Bergeron et al.

[11] 4,060,662
[45] Nov. 29, 1977

[54] ARTICLE HAVING A SURFACE LAYER OF CATALYTIC ASH BY-PRODUCT OF COAL COMBUSTION

[75] Inventors: Clifton G. Bergeron, Urbana; Lester W. Herron, St. Joseph, both of Ill.

[73] Assignee: University of Illinois Foundation, Urbana, Ill.

[21] Appl. No.: 607,493

[22] Filed: Aug. 25, 1975

[51] Int. Cl.$^2$ .................... B32B 15/04; B32B 15/18; A21B 1/00

[52] U.S. Cl. .................................. 428/450; 428/469; 428/472; 428/538; 428/539; 427/279; 427/330; 427/193; 126/19 R; 134/21; 106/48; 252/454; 252/461

[58] Field of Search ............... 428/538, 539, 450, 469, 428/472; 134/2; 126/19; 427/279, 330, 193

[56] References Cited

U.S. PATENT DOCUMENTS

| | | | |
|---|---|---|---|
| 2,976,166 | 3/1961 | White et al. | 427/193 |
| 3,266,477 | 8/1966 | Stiles | 126/19 R |
| 3,397,076 | 8/1968 | Little et al. | 428/538X |
| 3,423,568 | 1/1969 | Meckley et al. | 134/2 X |
| 3,460,523 | 8/1969 | Stiles et al. | 126/19 |
| 3,598,650 | 8/1971 | Lee | 134/2 |
| 3,704,153 | 11/1972 | Kanter | 427/193 |
| 3,759,240 | 9/1973 | Borowski | 126/19 R |
| 3,765,205 | 10/1973 | Schaumburg | 427/193 X |
| 3,827,983 | 8/1974 | Mitchell et al. | 134/4 X |

*Primary Examiner*—P. C. Ives
*Attorney, Agent, or Firm*—Merriam, Marshall & Bicknell

[57] ABSTRACT

Disclosed are products and processes useful in catalysis of chemical reactions, especially the oxidation of organic materials. Specifically described are oxidation processes involving catalytically-active compositions derived from the admixture by smelting of certain metal oxides, or derived as an ash by-product from the combustion of coal, and which preferably include oxides of titanium, iron, magnesium and manganese as well as oxides of silicon, aluminum, calcium and potassium. Also described are substantially non-porous catalytic layers including such compositions which are useful in the manufacture of liners for "continuous cleaning" cooking devices.

14 Claims, 1 Drawing Figure

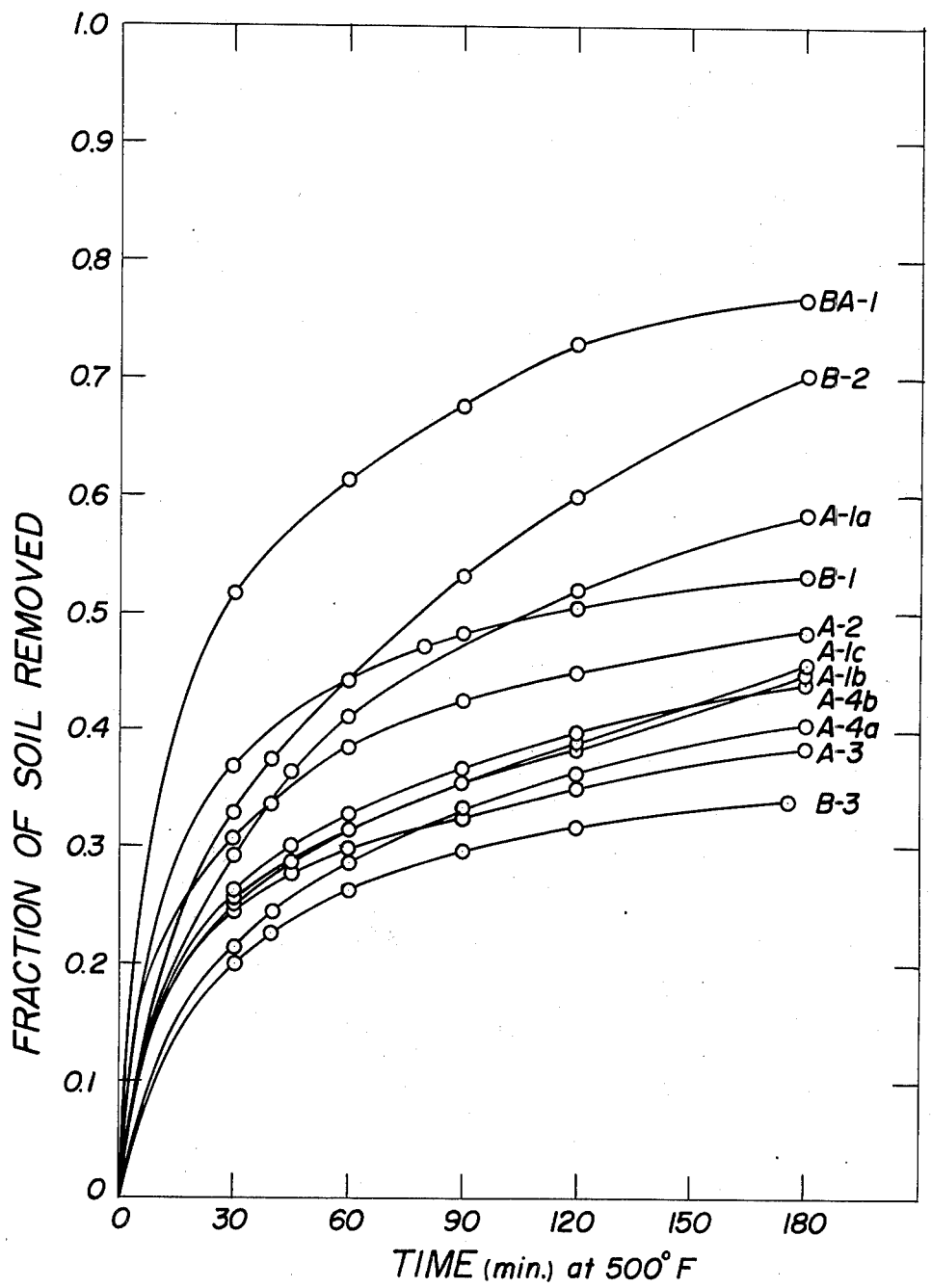

ARTICLE HAVING A SURFACE LAYER OF CATALYTIC ASH BY-PRODUCT OF COAL COMBUSTION

BACKGROUND OF THE INVENTION

1. Field of the Invention

The present invention pertains to catalysis of chemical reactions such as the oxidation of organic materials. More specifically, it relates to the use of ash by-products from the combustion of coal, and/or compositions substantially identical to such by-products, as oxidative catalytic surface layers for the liners of cooking devices. The invention also specifically relates to substantially non-porous catalytic layers suitable for use in such cooking devices.

2. Description of the Prior Art

The so-called "self cleaning" ovens require temperatures in excess of 750° F and utilize the mechanism of pyrolysis to effect removal of food spatters from the surface of oven walls. "Continuous cleaning" ovens incorporate oxidizing catalysts on the surface of the oven walls to effect such removal at temperatures in the normal cooking range of 350° to 550° F.

It is generally proposed that the continuous cleaning oven surfaces absorb oxygen from the atmosphere, which oxygen is either stored or diffused throughout the catalytic coatings thereon. The excess oxygen within the surface layer is believed to supply food spatters with an atmosphere of essentially pure oxygen, effectively reducing the temperature required for the oxidation of food soils in contact with the catalytic surface.

Stiles U.S. Pat. No. 3,266,477 describes a process in which catalytic oxide powders (including oxides of cobalt, nickel, cerium, ruthenium, palladium and platinum) are either dusted on a pre-fired enamel-coated metallic plate and then sintered to the glass surface or are applied by dipping enameled specimens in metal chloride solutions and drying at 400° C. The reference describes the importance of retaining the catalytic particles on the surface and not allowing them to become deeply embedded in the bonding media because access to embedded particles would be restricted by the bonding media, rendering them relatively catalytically inactive.

The more recent Lee U.S. Pat. No. 3,598,650 describes a process that assertedly provides improved catalytic activity through incorporating, by smelting, high concentrations of certain oxidation-inducing metal oxides into the glass matrix of a frit and subsequently applying the material as a porcelain enamel to oven liners or walls. Because the catalytic material is homogeneously dispersed through the thickness of the coating in such a process, normal abrasion or wear on the surface ordinarily will not remove the catalyst as is the case with use of a catalytic surface layer of the type described by Stiles.

The types of catalytic coatings described by Lee and by Moreland, U.S. Pat. No. 3,587,556, that is, ones having a catalyst dispersed homogeneously through a ceramic coating, are in common use in industry today. Originally these coatings were applied to fired, ground-coated plates and then refired--a two-coat, two-fire process. Presently, however, there is a trend toward a one-coat, one-fire process in which the catalytic material (with some additions to improve adherence) is applied directly onto sheet steel base layer plates and fired. Catalytic enamel frits are ordinarily ground in a ball mill (with mill additions to improve the rheological properties of the slip) to a fineness of about 0.2% retained on a 325 mesh screen and applied to ground-coated plates by spraying or flow coating.

For one-coat "direct-on" use, aluminum metal is usually added to the catalytic enamel slip and blended in a low shear blunger. The aluminum metal in the catalytic coating improves the adherence by limiting the crack propagation at the iron-enamel interface and by improving the mechanical properties of the enamel.

Compositions of catalytic materials and especially ceramic coatings vary widely, but the base enamel is usually an alkali-boro-silicate glass with 5 to 70% of a metal oxide catalyst and small additions of various opacifiers and nucleating agents to promote crystallization. The metallic oxides are usually combinations of the costly first period transition metal oxides.

The porosity of the coating is believed to affect both the mechanical properties and the cleaning performance of the coating. While very highly porous coatings are generally believed to increase the surface area available for oxidation to take place, and hence provide optimal oxidation characteristics, they ordinarily have poor mechanical properties and are easily removed during moderately abrasive cleaning processes.

SUMMARY

According to the present invention ash by-products from the combustion of coal are employed in a finely divided state as catalysts for the oxidation of organic materials. The utility, for similar purposes, of compositions fabricated from constituents of the type found in such ash is also disclosed. Described generally are articles of manufacture having a base layer and a surface layer useful for catalytically enhancing such oxidation and wherein the surface layer comprises such ash or "fabricated" ash compositions. More particularly described are metallic liners for cooking devices which liners have adhered to the operative surface thereof coatings of such ash or "fabricated" ash compositions. Also described is the discovery that substantially non-porous catalytic surface layers provide substantial advantages over porous surface layers.

Coated surfaces herein described demonstrate a capacity to catalytically enhance the oxidation of organic materials heretofore generally unobtainable, yet they may be obtained at a fraction of normal cost due to the inexpensiveness of catalytically active materials employed and to the ease with which the materials may be applied.

BRIEF DESCRIPTION OF THE DRAWING

The advantages secured by the practice of the present invention will be more fully understood upon consideration of the following description thereof in conjunction with the drawing wherein:

FIG. 1 is a graphic representation of the catalytic activity of a surface layer of the invention in comparison with that of ten commercially available catalytic surface layers.

DESCRIPTION

The disclosure of the thesis of co-inventor Lester Wynn Herron entitled "Kinetics of Soil Removal From Catalytic Ceramic Coatings" made available at the Engineering Library of the University of Illinois, Urbana, Ill. (Call No. 620.14 H43K) concurrently with the filing of this application, is specifically incorporated by reference herein.

In the practice of the invention, ash by-products of the combustion of coal are employed in a finely divided state as catalytic agents for the oxidation of organic materials. As employed herein, the term, "ash by-product of the combustion of coal" shall mean and include such products as are formed in the course of the combustion of coal (which, prior to burning, typically comprises complex hydrocarbons and from about 5 to about 40 weight percent inorganic material such as rock or clay) of various ranks and grades at temperatures of from about 2700° F to about 3000° F in either reducing or, preferably, oxidizing, atmospheres in coal boilers of "dry" or, preferably, "wet" types. As such, the term includes both "bottom ash," i.e., the glassy or partially crystalline and sometimes powdery slag residue of coal combustion normally principally composed of heavier elements and normally quenched (fritted) in cold water and dried, as well as "fly ash," i.e., the glassy and generally hollow, spherical particulate residue normally principally composed of relatively lighter elements exhausted from the coal combustion chamber with waste gases. The ash by-products are regarded as virtually useless for any purpose other than land fill.

It has been discovered that such ash by-products are excellent oxidation catalysts which can be quite advantageously employed as surface layers for operative surfaces of devices commonly employed in the heating of organic materials and especially in the cooking of foodstuffs.

It has also been found that compositions of matter fabricated to substantially duplicate the constitution of such ash by-products are suitable for similar purposes.

These aspects of the invention may be more thoroughly understood through consideration of the following illustrative examples of its practice.

EXAMPLE 1

Examplary bottom ash materials suitable for use according to the invention and hereafter referred to by sample designation may generally be secured from the following coal burning power plant sources:

| Sample Designation | Source |
| --- | --- |
| BA-1 | Muskingham River Plant; American Electric Power Co.; Illinois |
| BA-2 | Paradise Plant; Tennessee Valley Authority; Louisville, Kentucky |
| BA-3 | Ohio Valley Electric Corp.; Gallipolis, Ohio |
| BA-4 | Clifty Creek Station; Indiana-Kentucky Electric Corp.; Madison, Indiana |
| BA-5 | Commonwealth Edison Corp.; Will County, Illinois |
| BA-6 | Philo Generating Plant; Ohio Power Co.; Philo, Ohio |
| BA-7 | Ohio Power Co.; Moundsville, West Virginia |
| BA-8 | Tanners Creek Generating Division; Indiana & Michigan Electric Co.; Lawrenceburg, Indiana |

Typical compositional analyses of the above-identified bottom ash samples are set out in Table 1, below.

TABLE 1

| Component | BA-1 Muskingham River Wt. % | BA-8 Tanners Creek Wt. % |
| --- | --- | --- |
| $SiO_2$ | 42.0 | 53.9 |
| $Al_2O_3$ | 19.4 | 21.9 |
| $TiO_2$ | 0.83 | 0.97 |
| $Fe_2O_3$ [a] | 24.0 | 21.2 |
| MgO | 8.74 | 1.40 |

TABLE 1-continued

| Component | BA-1 Muskingham River Wt. % | BA-8 Tanners Creek Wt. % |
| --- | --- | --- |
| CaO | 2.68 | 1.88 |
| $K_2O$ | 1.36 | 1.58 |
| $MnO_2$ | 0.31 | 0.26 |

[a] Reported as $Fe_2O_3$ although FeO also present

Exhaustive analyses of the elemental composition of bottom and fly ashes from the combustion of coal are to be found in the literature. One such reported analysis appears in the Bolton, et al. Progress Report (June, 1971–January, 1973) "Trace Element Measurements At The Coal-Fired Allen Steam Plant," Report No. ORNL-NSF-EP-43, under the U.S. Atomic Energy Commission Contract No. W-7405-eng-26 and supported by NSF Interagency Agreement No. AEC 40-237-70 and NSF AG 398, dated March, 1973.

EXAMPLE 2

Preparation of "Fabricated" Bottom Ash Compositions

Three compositions of varying constitution which resemble bottom ash in catalytic activity, and hence suitability for use according to the present invention, were fabricated as homogeneous melts by the simple procedure of melting certain oxides together at about 2400° F to about 2800° F and preferably 2500° F. Analyses of the three compositions (designated FBA-1, FBA-2 and FBA-3) are set forth in the following Table 2.

TABLE 2

| Component | FBA-1 Wt. % | FBA-2 Wt. % | FBA-3 Wt. % |
| --- | --- | --- | --- |
| $SiO_2$ | 51.0 | 45.0 | 39.0 |
| $Al_2O_3$ | 5.7 | 5.0 | 4.3 |
| $TiO_2$ | 1.1 | 1.0 | 0.87 |
| FeO | 15.0 | 25.0 | 35.0 |
| MgO | 13.6 | 12.0 | 10.4 |
| CaO | 5.7 | 5.0 | 4.3 |
| $K_2O$ | 5.7 | 5.0 | 4.3 |
| $MnO_2$ | 2.3 | 2.0 | 1.7 |

EXAMPLE 3

Analyses of exemplary bottom ashes (BA's) and "fabricated" bottom ashes (FBA's) in terms of common upper and lower ranges of their components provide the comparative data set forth in Table 3.

TABLE 3

| Component | Common Lower Range, Wt. % | Common Upper Range, Wt. % |
| --- | --- | --- |
| $SiO_2$ | 39.0 | 53.9 |
| $Al_2O_3$ | 4.3 | 21.9 |
| $TiO_2$ | 0.83 | 1.1 |
| FeO | 15.0 | 35.0 |
| MgO | 1.4 | 13.6 |
| CaO | 1.83 | 5.7 |
| $K_2O$ | 1.36 | 5.7 |
| $MnO_2$ | 0.26 | 2.3 |

Analysis of the constituent materials of bottom ash and "fabricated" bottom ash compositions in terms of known catalytic activity reveals that the oxides of iron, titanium, magnesium, and manganese are highly probably essential components of preferred catalytic compositions according to the present invention. Of lesser importance are the oxides of aluminum, calcium and potassium. When catalytic compositions of the invention are to be incorporated in a frit for application as a catalytic surface layer to a base layer substrate it is, of course, preferably to include silica in substantial quantities.

It is therefore proposed that manufactured catalytic compositions suitable for use according to the present invention preferably comprise the components and proportion set forth in Table 4.

TABLE 4

| Component | Wt. % |
|---|---|
| $SiO_2$ | 0 –60 |
| $Al_2O_3$ | 0 –25 |
| $TiO_2$ | 0.5 – 5 |
| FeO | 10.0 – 40 |
| MgO | 0.5 – 20 |
| CaO | 0 –10 |
| $K_2O$ | 0 –10 |
| $MnO_2$ | 0.1 – 5 |

The foregoing components would total 100 weight percent as they vary within the ranges indicated.

EXAMPLE 4

A. Preparation of Coated Samples for Catalytic Activity Testing

Bottom ash and "fabricated" bottom ash over-spray slips are processed to a finely divided state by grinding the ash with water in a ball mill to a particle fineness preferably in the range of about 44 microns to about 74 microns. A fineness of 5% on a 200 mesh screen has been found to be quite suitable. In some cases it may be desirable to include in the grinding process various mill additions, such as minor quantities of bentonite and/or the "ground coat" material to be employed in supporting the ash products on a base layer or substrate. Coated substrates are prepared by spraying the ash or "fabricated" ash slip onto a dry, and/or damp unfired ground-coated base layer, such as a sheet steel plate. (A suitable ground coat for this purpose is described in Example 5, infra.) After drying, the plates are fired at about 1575° F for 5 minutes. The cooled plates may be brushed or cleaned by water pressure, or preferrably in an ultrasonic cleaner to remove excess ash.

It may be noted that the coating process above-described is substantially simpler than that employed in the two-coat, two-fire process employed in preparing most commercial coated liners, yet does not involve the use of aluminum metal additives as are commonly employed in one-coat practices.

B. Sample Testing

Illustrative of the activity of bottom ash and "fabricated" bottom ash compositions when employed as catalytic layers are the following exemplary test results for weight loss due to oxidation of Wesson Oil[a] on various ash coated samples heated at a temperature of 500° F for a period of 3 hours.

(a) The Wesson oil was applied with an eye dropper in excess over the sample. The sample was held over a Bunsen burner momentarily to allow the oil to coat the specimen completely. The excess oil was then blotted off with a lintless paper towel to the extent that the remaining oil layer would not run or drip off the specimen when held in vertical position.

TABLE 5

| Coating Material | Weight Loss (percent) |
|---|---|
| BA-1 | 81.8 |
| BA-2 | 84.4 |
| BA-3 | 69.0 |
| BA-4 | 83.6 |
| BA-5 | 83.6 |
| BA-6 | 77.2 |
| BA-7 | 82.4 |
| BA-8 | 75.0 |
| FBA-1 | 78.1 |
| FBA-2 | 77.3 |

TABLE 5-continued

| Coating Material | Weight Loss (percent) |
|---|---|
| FBA-3 | 74.8 |

It may be noted from the above that the mean percentage removal of the bottom ash (BA) may be calculated to be 79.6% and that of the "fabricated" bottom ash (FBA) 76.7%. The percentage removal values obtained are not substantially different from those obtained when samples are further treated to deposit thereon a film of gold and palladium prior to testing.

FIG. 1 graphically represents the catalytic capability of BA-1 in comparison with the capabilities of ten commercially available oven liner catalytic surface layers tested under identical conditions. As demonstrated in the Figure, the BA-1 sample revealed a much higher initial rate of soil removal and a higher overall removal than any of the ten commercial samples tested (designated in FIG. 1 as B-1, B-2, B-3, A-1a, A-1b, A-1c, A-2, A-3, A-4a and A-4b.)

It has been noted that some improvement in the catalytic activity of ash and "fabricated" ash may be derived from calcining at about 1100° C for a short time in order to ensure more complete oxidation of the iron component to its highest catalytic activity state. The ash, so additionally heat-processed, may then be made into a slip for spraying onto an unfired, ground-coated substrate and fired as described above. The calcining process also has a tendency to materially darken the ash to a charcoal gray-to-black color which enhances its attractiveness as a cooking device liner coating material in that the darker color aides in "hiding" stained areas from view while oxidation of the soil takes place.

According to another aspect of the invention it has been discovered that substantially non-porous catalytic layers such as obtained through application of the ash and "fabricated" ash products described above provide enhanced catalytic activity in comparison to more porous coatings of conventional type.

A method for distinguishing porous catalytic layers of the prior art from substantially non-porous layers of the invention, as the term is herein employed, involves measurement of the capacity of a given catalytic layer to "pick-up" or absorb vegetable oil at ambient temperatures compared to the capacity of a "standard" surface (a fired, but otherwise untreated, ground-coated metallic or other base layer) to so adsorb the oil. When, for example, the amount of oil adsorbed on a ground-coated substrate is normalized to a value of 1, most commercially available transition metal oxide catalytic layers will have relative porosity values for oil adsorption on the order of 4 or 5 (i.e., they adsorb 4 to 5 times as much oil as the ground-coated substrate). Ash and "fabricated" ash coating layers as described above ordinarily have relative porosity values on the order of about 1.1 to about 1.7. A substantially non-porous coating is one which has an oil adsorption relative porosity value of less than about 2.5. The following example relates to the manner in which the porosity of a catalytic layer is calculated in order to determine whether it is substantially non-porous as the term is employed herein.

EXAMPLE 5

The porosity determination is made on a relative basis and with respect to a "standard" surface consisting of a metallic or other base layer substrate coated with a ground coat material and fired, but otherwise untreated. A ground coat suitable for use in this determination may be prepared according to the formulation designated by Ingram-Richardson Company, Frankfort, Ind. for preparing a "No. 223 Hard Ground Coat". The mill formulation for these materials is as follows:

| Component | Parts By Weight |
| --- | --- |
| "No. 223 Frit" | 600 |
| "G Frit" | 150 |
| "No. 480 Frit" | 250 |
| +No. 75 Clay" | 70 |
| 325 mesh Silica | 90 |
| Borax | 7.5 |
| Bentonite | 2.5 |
| Magnesium carbonate | 1.25 |
| Water | 450 |

The first four components of the formulation are available from the Ingram-Richardson Company according to the indicated product designations. The materials are ground in a ball mill to a fineness of 5-7% on a 200 mesh screen, applied by spraying to a base layer substrate, air dried, and fired at about 1550°-1575° F to maturity.

Porosity measurements are carried out as follows. Samples of a ground-coated substrate and the catalytic material coated substrate to be tested are cut to have substantially identical planar areas. Samples measuring ¾ × inch 2 inches and having a total planar area of 1.5 square inches are easily handled. The samples are cleaned with water in an ultrasonic cleaner, dried and weighed. Thereafter, the samples are placed on a paper towel with the coated side up and an excess of Wesson oil (or other vegetable oil having a viscosity of approximately 750 centipoise at ambient temperature) is applied with a dropper and allowed to soak for 10 minutes. The samples are then placed on an absorbent paper towel, inclined at about 60° from horizontal and allowed to drain for 30 minutes. The samples are thereafter reweighed to obtain the amount of adsorbed oil in grams.

The weight of oil adsorbed by the catalytic layered sample is then divided by the weight of oil adsorbed by the ground-coated sample to obtain a relative oil adsorption value. As noted above, a relative oil adsorption porosity value of less than 2.5 indicates a substantially non-porous surface.

Apart from the test results illustrated in FIG. 1, applicants' discovery is substantiated by the following analyses. The rate law for the oxidation of a material such as Wesson oil on a substantially non-porous catalytic surface layer can be described by the diffusion-controlled, contracting-area rate law, equation (1), as long as the soil remains in intimate contact with the catalytic surface.

$$(1 - (1 - f)^{\frac{1}{2}})^2 = kt \quad (1)$$

where $f$ = fraction of soil removed or oxidized
$k$ = rate constant
$t$ = time

This rate law describes the oxidation of a low viscosity soil in which the rate controlling step is the diffusion of oxygen through the soil layer to the surface of the catalytic layer where oxidation occurs or diffusion of reaction products away from the catalytic layer. As oxidation proceeds, the taller projections of the catalytic coating begin to protrude through the soil layer. The soil layer becomes thinner as the soil is oxidized at the catalytic surface, therefore, the amount of surface covered by the soil decreases and the rate of weight loss from the coating decreases. At this stage of the process, the taller projections of the coating are free of soil and the soil remaining is present only in the lower depressions of the coating. In a substantially non-porous coating the diffusion-controlled, contracting-area rate law describes the weight loss as long as the soil is in intimate contact with the catalytic coating.

The oxidation of a low viscosity soil such as Wesson oil on a porous coating requires two rate laws to describe the oxidation weight loss during the period of intimate contact between the soil and the coating. During the initial stages of oxidation, the diffusion-controlled, contracting-area rate law describes the weight loss even though the coating is porous. Up to this stage in the oxidation process, the surface area is being reduced just as in the case of a non-porous coating since the pores are under the soil layer. However, as the reaction proceeds the surface area of the coating covered with soil is reduced to the point where the remaining soil is located only in the deep pores of the coating. From this stage on, the diffusion-controlled, contracting-area rate law is no longer valid. Due to the shape of the pores, the surface area in contact with the soil remains nearly constant until the soil is completely oxidized. Since the area is constant, the rate of oxidation of the soil is dependent only upon the rate of diffusion of oxygen or reaction products through the soil in the pore. The pores provide longer diffusion paths for the rate limiting species and thus reduce the rate of soil removal by oxidation. This stage in the oxidation of the Wesson oil can be described by the diffusion-controlled rate law, equation (2).

$$f = kt^{\frac{1}{2}} \quad (2)$$

The weight loss according to the diffusion-controlled, contracting-area rate law is linear for a short time. A gradual transition from the diffusion-controlled, contracting-area rate law to the diffusion-controlled rate law occurs. This transition occurs as the soil on the surface of the coating nears complete oxidation and the remaining soil is located only in the pores of the coating, where the surface area in contact with the soil varies only slightly as oxidation proceeds. After the transition is complete, the diffusion-controlled rate law describes the weight loss from oxidation of the soil until it becomes viscous enough to loose intimate contact with the coating.

When the soil becomes so viscous that material transport to the surface of the coating is lower than the rate of removal of the soil by oxidation, the intimate contact between the soil and the coating is broken. Once this happens, the catalytic activity of the coating and the type of structure, porous or substantially non-porous, have no effect on the oxidation rate of the loosened soil. Further oxidation is very slow since the catalytic coating is not involved. Oxidation then occurs by the oxidation of the soil in air. The rate of weight loss due to oxidation of the loosened soil is dependent upon the concentration of the soil and the concentration of the oxygen. This type of reaction can be described by a second order rate law, equation (3).

$$f/(1-f) = kt \quad (3)$$

The above analysis reveals rather conclusively that, prior to such time as an organic material soil becomes so viscous as to render intimate contact with the catalytic coating impossible, the use of a substantially non-porous catalytic material surface layer results in the uniform operation of the more favorable diffusion-controlled contracting-area oxidation rate law, while use of a porous surface layer will ordinarily result in oxidation proceeding for at least some time according to the less favorable diffusion-controlled rate law. Thus, to the extent that substantially non-porous catalytic material surface layers allow for a more uniform oxidation according to a more favorable rate law, such surfaces are catalytically superior to porous surfaces.

Obviously modifications and variations of the invention described will occur to those skilled in the art and therefore only such limitations should be placed thereon as appear in the appended claims.

What is claimed is:

1. In an article of manufacture having a surface layer including means for catalytically enhancing the thermal oxidation of organic materials and a substrate for supporting the surface layer, the improvement wherein said surface layer comprises a finely divided ash by-product of the combustion of coal.

2. The improvement of claim 1 wherein said ash by-product is bottom ash.

3. The improvement of claim 1 wherein said ash by-product is fly ash.

4. In an article of manufacture having a surface layer including means for catalytically enhancing the thermal oxidation of organic materials and a substrate for supporting the surface layer, wherein said surface layer comprises a composition consisting essentially of

|  | Wt. % |
|---|---|
| $SiO_2$ | 0 – 60 |
| $Al_2O_3$ | 0 – 25 |
| $TiO_2$ | 0.5 – 5 |
| FeO | 10 – 40 |
| MgO | 0.5 – 20 |
| CaO | 0 – 10 |
| $K_2O$ | 0 – 10 |
| $MnO_2$ | 0.1 – 5 . |

5. In a metallic cooking device liner wherein there is provided a surface layer including means for catalytically enhancing the thermal oxidation of organic materials in contact therewith, the improvement wherein said surface layer comprises a finely divided ash by-product of the combustion of coal.

6. The improvement of claim 5 wherein said ash by-product is bottom ash.

7. The improvement of claim 5 wherein said ash by-product is fly ash.

8. In a metallic cooking device liner wherein there is provided a surface layer including means for catalytically enhancing the thermal oxidation of organic materials in contact therewith, the improvement wherein said surface layer comprises a composition consisting essentially of

|  | Wt. % |
|---|---|
| $SiO_2$ | 0 – 60 |
| $Al_2O_3$ | 0 – 25 |
| $TiO_2$ | 0.5 – 5 |
| FeO | 10 – 40 |
| MgO | 0.5 – 20 |
| CaO | 0 – 10 |
| $K_2O$ | 0 – 10 |
| $MnO_2$ | 0.1 – 5 . |

9. In the process for thermal oxidation of organic materials wherein the materials are heated in the presence of a gaseous atmosphere including oxygen and contacted with a finely divided oxidation catalyst, the improvement wherein said oxidation catalyst is a finely divided ash product of the combustion of coal.

10. The improvement of claim 9 wherein said ash by-product is bottom ash.

11. The improvement of claim 9 wherein said ash by-product is fly ash.

12. In the process for thermal oxidation of organic materials wherein the materials are heated in the presence of a gaseous atmosphere including oxygen and contacted with a finely divided oxidation catalyst, the improvement wherein said oxidation catalyst is a composition consisting essentially of

|  | Wt. % |
|---|---|
| $SiO_2$ | 0 – 60 |
| $Al_2O_3$ | 0 – 25 |
| $TiO_2$ | 0.5 – 5 |
| FeO | 10 – 40 |
| MgO | 0.5 – 20 |
| CaO | 0 – 10 |
| $K_2O$ | 0 – 10 |
| $MnO_2$ | 0.1 – 5 . |

13. In an article of manufacture having a surface layer including means for catalytically enhancing the thermal oxidation of organic materials and a substrate for supporting the surface layer, the improvement wherein said surface layer is substantially non-porous.

14. The improvement of claim 13 wherein said substantially non-porous surface layer is an ash by-product of the combustion of coal.

* * * * *